Nov. 1, 1932. T. B. FLANAGAN 1,885,705
WEIGHING SCALE
Original Filed June 5, 1928
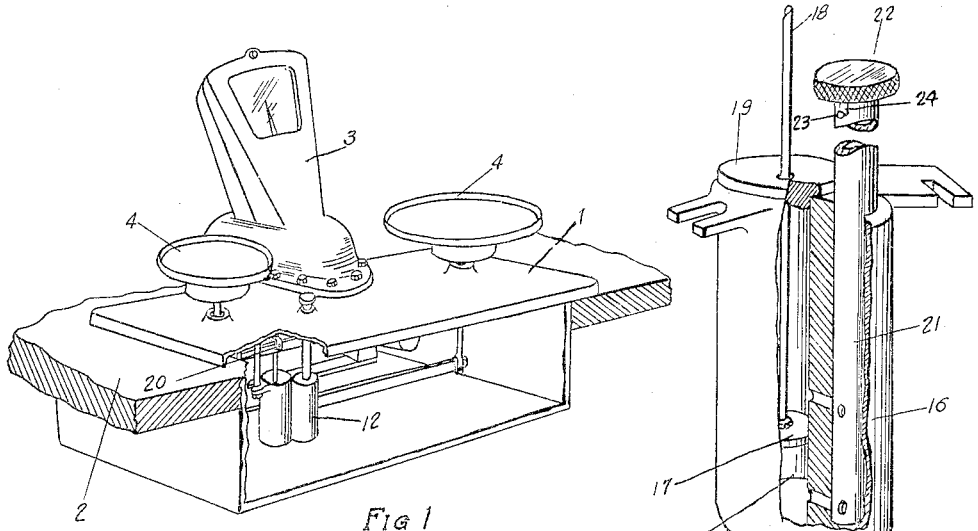
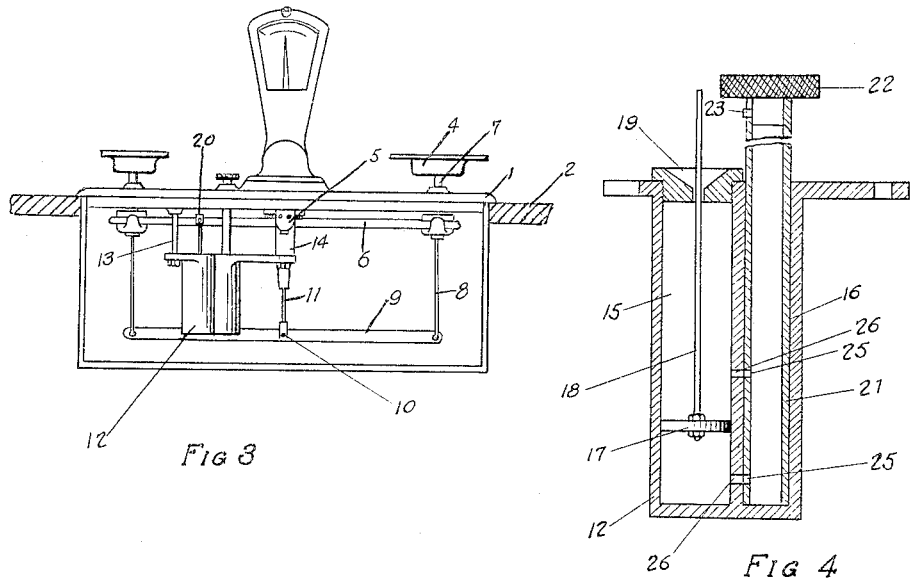

Patented Nov. 1, 1932

1,885,705

UNITED STATES PATENT OFFICE

THOMAS B. FLANAGAN, OF COLUMBUS, OHIO, ASSIGNOR TO THE EXACT WEIGHT SCALE COMPANY, OF COLUMBUS, OHIO, A CORPORATION OF OHIO

WEIGHING SCALE

Application filed June 5, 1928, Serial No. 283,020. Renewed March 14, 1932.

My invention relates to weighing scales. More particularly, it pertains to weighing scales that are especially adapted for use in places where the weighing of packages is more or less continuous.

I have devised a scale wherein the reading of the weight indication is greatly facilitated while providing a scale having numerous other advantageous features. For instance, my invention contemplates a scale wherein the majority of working parts which, heretofore, have been mounted on a base that ordinarily rested on the upper surface of a table, are disposed beneath the table or other supporting surface level while those parts of the scale used by a workman in weighing operations are above the table or other supporting surface level.

In conjunction with the provision of a scale of the above type, my invention contemplates the provision of a dash pot therefor which may be filled and adjusted from above the table or other supporting surface but has its main body portion disposed below the table or other supporting surface in order that it may be effective on the scale mechanism also disposed therebeneath. My invention contemplates further facilitating the use of the scale by having the weight indicating mechanism in an off-set position rather than in its normal position between the weight pan and commodity pan of the scale.

The preferred form of my invention and the above and other features thereof may be seen in the following detailed description and the accompanying drawing wherein similar characters of reference designate corresponding parts and wherein:

Figure 1 is a perspective view of the preferred form of my invention.

Figure 2 is a perspective view, partly broken away and partly in section of the dash pot which I employ.

Figure 3 is a front view of the scale shown in Figure 1.

Figure 4 is a sectional view of the dash pot shown in Figure 2.

In the drawing, I have shown a scale comprising a platform or plate 1 which has a portion adapted to fit within an opening in a table or other supporting surface 2 and a portion adapted to rest on such table or other supporting surface. A tower 3 which covers the weight indicating mechanism is mounted on this platform or plate 1 in off-set relation to pans 4 which serve as commodity and weight pans.

Suspended from the under side of the platform or plate 1 and substantially in the center thereof is a bearing 5 on which the main lever 6 of the scale is pivotally mounted, preferably on knife edge trunnions (not shown). Mounted on opposite ends of the main lever 6 by means of the usual bearing constructions used in scales are rods 7 which extend upwardly through the platform or plate 1 and carry the respective weight and commodity pans 4 on their upper ends.

Depending downwardly from the bearing constructions on opposite ends of the main lever 6 are rods 8. Pivotally connected to the lowermost ends of these rods 8 is a check rod 9 which is pivotally mounted as at 10 intermediate the opposite ends thereof to the lowermost end of a rod 11.

A dash pot 12 is suspended from the underside of the platform or plate 1 by means of a bolt 13 and the lower part of the yoke 14. Such dash pot consists of a cylinder 15 and a cylinder 16 whose adjacent side walls are preferably integral with each other. A piston 17 having a piston rod 18 is mounted and adapted to reciprocate in the cylinder 15 and the piston rod 18 extends upwardly through an opening in a screw cap 19 which serves as a closure for the upper end of the cylinder. The uppermost end of the piston rod 18 is attached as at 20 to the main lever 6 of the scale.

The cylinder 16 contains a hollow cylinder 21 which is rotatable therein but which so fits within the cylinder 16 as to remain in one position until manual force is applied to move it. A cap 22, adapted to close the top of the hollow cylinder 21 has a pin 23 on the side thereof that fits within a groove 24 in the hollow cylinder. Referring to Figures 2 and 4, it will be apparent that the cylinder 21 may be rotated in the cylinder 16 by turning the cap 22 or that the cylinder 21 may be opened by lifting the cap 22 out of cooperative relation with the top thereof. The cylinder 21 normally extends through the platform or plate 1 and the cap 22 is disposed above the platform or plate.

In the lower body portion of the hollow cylinder 21 I have provided ports or openings 25 through the wall of the cylinder. When the cylinder 21 is disposed in the cylinder 16, the ports or openings 25 are normally complemental to similar ports or openings 26 in the wall between the cylinder 16 and the cylinder 15. As shown, the piston rod 18 if of such length that the piston will reciprocate between the respective ports or openings 26.

In the operation of the dash pot 12, it will be understood that the cylinders 15 and 16 are partially filled with a fluid, preferably oil. As the piston 17 is moved downwardly by the downward movement of the main lever 6 of the scale, the piston rod 18 being attached to the main lever 6 as at 20, the fluid beneath the piston will be forced through the lowermost ports or openings 26 and 25 in the dividing wall between the cylinders 15 and 16 respectively, providing such ports coincide, and the wall of the cylinder 21 and into the cylinder 21 from which it will flow by way of the uppermost ports or openings 25 and 26 into the cylinder 15 above the piston. When the piston 17 is moved upwardly, the fluid above the piston will flow through the uppermost ports or openings 26 and 25, into the cylinder 21 and through the lowermost ports or openings 25 and 26 into the cylinder 15 below the piston 17.

As hereinbefore stated, the cylinder 21 is rotatable in the cylinder 16. When it is desired to vary the rate of upward or downward movement of the piston 17 in proportion to the amount of weight on the scale pan, it is only necessary to rotate the cylinder 21 in the cylinder 16 to vary the size of the passage way through the respective ports 25 and 26. For instance, when it is desired to decrease the rate of downward movement of the piston 17, the cylinder 21 is rotated by means of the cap 22 until only a small part of ports 25 coincide with the ports 26, it being apparent that the piston 17 may move with the least resistance when the ports or openings exactly coincide. The size of the passageways through the ports 25 and 26 may be varied to obtain any desired resistance to the movement of the piston 17 and means may be provided in conjunction with the cap 22 for indicating the relative position of the ports 25 to the ports 26.

Referring to the preceding description and the drawing attached hereto, it will be clearly seen that I have provided a weighing scale having the advantageous feature of being lower than the ordinary weighing scale whereby the use of the scale where weighing of packages is practically continuous is greatly facilitated for the reason that it is only necessary to expend a minimum of effort. This is partly due to the fact that the scale is countersunk, that is, a part of the scale is below the table or working surface level on which the scale is mounted. The use of the scale is further facilitated due to the fact that the housing which covers the weight indicating mechanism of the scale together with being off-set with relation to the weight and commodity pans is inclined vertically away from the scale.

A further advantageous feature resides in the fact that I have provided a dash pot which while being located in conjunction with the working parts of the scale which are disposed beneath the table or other supporting surface, embodies a structure capable of being filled and adjusted from above the table or other supporting surface.

Having thus described my invention, what I claim is:

1. In a weighing scale, a plate, weighing mechanism suspended from the under surface of said plate, weight pans and weight indicating mechanism disposed above said plate and an inclined housing for said weight indicating mechanism.

2. In a weighing scale, a plate, weighing mechanism suspended from the under surface of said plate, weight pans and weight indicating mechanism disposed above said plate and an inclined off-set housing for said weight indicating mechanism.

3. In a weighing scale, a plate, weighing mechanism suspended from the under surface of said plate, weight pans and weight indicating mechanism disposed above said plate and a dash pot in association with the weighing mechanism below said plate.

4. In a weighing scale, a plate, weighing mechanism suspended from the under surface of said plate, weight pans and weight indicating mechanism disposed above said plate, a dash pot in association with the weighing mechanism below said plate, said dash pot being so constructed that it may be adjusted from above said plate.

5. In a weighing scale, a plate, weighing mechanism suspended from the under surface of said plate, weight pans and weight indicating mechanism disposed above said plate, a dash pot in association with the weighing mechanism below said plate, said dash pot being so constructed that it may be filled with a liquid from above said plate.

6. In a weighing scale, a plate, weighing mechanism suspended from the under surface of said plate, weight pans and weight indicating mechanism disposed above said plate, a dash pot in association with the weighing mechanism below said plate, said dash pot being so constructed that it may be filled with a liquid and adjusted from above said plate.

7. A weighing scale comprising weighing mechanism, weight indicating mechanism including a dial, and a tower having an enlarged base, an inclined portion enclosing the dial whereby the reading of the weight indicated by the weight indicating mechanism is facilitated.

8. A weighing scale comprising a plate, weighing mechanism suspended from the under surface of said plate, weighing pans and weight indicating mechanism disposed above said plate, and a housing for said weight indicating mechanism, said housing being inclined rearwardly.

9. In a weighing scale, a plate, weighing mechanism supported beneath said plate, weight pans and weight indicating mechanism disposed above said plate, and a dash pot beneath said plate and in association with the weighing mechanism beneath said plate, said dash pot being so constructed that it may be filled from above said plate.

10. In a weighing scale, a plate, weighing mechanism supported beneath said plate, weight pans and weight indicating mechanism disposed above said plate, and a dash pot beneath said plate and in association with the weighing mechanism beneath said plate, said dash pot being so constructed that it may be filled and adjusted from above said plate.

11. In a weighing scale, a plate, weighing mechanism supported beneath said plate, weight pans and weight indicating mechanism disposed above said plate, and a dash pot beneath said plate and in association with the weighing mechanism beneath said plate, said dash pot being so constructed that it may be adjusted from above said plate.

12. In a weighing scale, a plate, weighing mechanism supported beneath said plate, weight pans and weight indicating mechanism disposed above said plate, a dash pot cylinder beneath said plate and in association with the weight mechanism beneath said plate, ports in said cylinder, a tube in association with the dash pot cylinder and having ports adjustable into and out of alignment with said ports in said cylinder, and a cap mounted upon said tube in such a manner that it may be rotated to rotate said tube, said cap being located above said plate and being removable to permit the introduction of a fluid into said tube.

In testimony whereof I hereby affix my signature.

THOMAS B. FLANAGAN.